United States Patent
Jessmore et al.

(10) Patent No.: US 6,796,746 B2
(45) Date of Patent: Sep. 28, 2004

(54) SUBTERRANEAN DRILLING AND IN SITU TREATMENT OF WASTES USING A CONTAMINATION CONTROL SYSTEM AND METHODS RELATING THERETO

(75) Inventors: James J. Jessmore, Idaho Falls, ID (US); Guy G. Loomis, Idaho Falls, ID (US); Mark C. Pettet, Idaho Falls, ID (US); Melissa C. Flyckt, Pocatello, ID (US)

(73) Assignee: Bachtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 10/278,341

(22) Filed: Oct. 22, 2002

(65) Prior Publication Data

US 2004/0076481 A1 Apr. 22, 2004

(51) Int. Cl.[7] .............................. E21B 41/00; G21F 5/00
(52) U.S. Cl. .................... 405/266; 405/129.5; 405/303; 175/424; 588/250; 588/252; 588/260
(58) Field of Search ........................... 175/424, 58, 60, 175/313; 405/129.1, 129.35, 129.45, 129.5, 129.85, 231–233, 236, 240, 266, 267, 269, 270, 303; 588/250, 252, 253, 260

(56) References Cited

U.S. PATENT DOCUMENTS

| | | | |
|---|---|---|---|
| 2,122,517 A | * 7/1938 | Curtis | 173/60 |
| 5,191,156 A | * 3/1993 | Jorgensen et al. | 405/129.35 |
| 5,206,067 A | * 4/1993 | Bonzo | 405/129.7 |
| 5,645,377 A | 7/1997 | Kauschinger et al. | 405/269 |
| 5,697,437 A | * 12/1997 | Weidner et al. | 405/128.3 |
| 5,893,680 A | * 4/1999 | Lowry et al. | 405/270 |
| 5,954,143 A | 9/1999 | McCabe et al. | 173/184 |
| 5,980,446 A | 11/1999 | Loomis et al. | 588/250 |
| 6,116,815 A | * 9/2000 | Chen | 405/129.85 |
| 6,120,214 A | 9/2000 | Iovino | 405/241 |
| 6,132,356 A | * 10/2000 | Schabdach et al. | 588/260 |
| 6,254,524 B1 | 7/2001 | Kauschinger | 588/249 |

* cited by examiner

*Primary Examiner*—Robert E. Pezzuto
*Assistant Examiner*—Tara L. Mayo
(74) *Attorney, Agent, or Firm*—Trask Britt PC (57) ABSTRACT

Systems and methods relating to subterranean drilling while maintaining containment of any contaminants released during the drilling. A thrust block installed over a zone of interest provides an overflow space for retaining any contaminants and excess sealant returns. Negative air pressure may be maintained in the overflow space by a ventilation system. Access ports in the thrust block seal the overflow space from the surrounding environment with a membrane seal. A flexible sack seal in the access port may be connected to a drill shroud prior to drilling, providing containment during drilling after the drill bit penetrates the membrane seal. The drill shroud may be adapted to any industry standard drilling rig and includes a connection conduit for connecting to the flexible sack seal and a flexible enclosure surrounding the drill shaft and of a length to accommodate full extension thereof. Upon withdrawal, the sack seal may be closed off and separated, maintaining containment of the overflow space and the drill shroud.

67 Claims, 4 Drawing Sheets

SUBTERRANEAN DRILLING AND IN SITU TREATMENT OF WASTES USING A CONTAMINATION CONTROL SYSTEM AND METHODS RELATING THERETO

GOVERNMENT RIGHTS

The United States Government has rights in the following invention pursuant to Contract No. DE-AC07-99ID13727 between the U.S. Department of Energy and Bechtel BWXT Idaho, LLC.

BACKGROUND OF THE INVENTION

The present invention relates generally to methods, components and systems for drilling and sealing at subterranean waste sites. These methods, components and systems may also be utilized for other subterranean drilling or sealing procedures. More particularly, embodiments of the present invention relate to the practice of methods for subterranean drilling and sealing where containment of contaminants is needed throughout the drilling and sealing procedures.

Drilling and grouting in hazardous environments, such as at waste sites containing radioactive contaminants (especially those with potential alpha radiation-emitting contaminants) has traditionally been performed remotely, under full containment conditions, or both. These conventional practices may require complex maintenance procedures, may have increased potential for loss of equipment, result in increased secondary waste issues and excessive down time with substantial risk to both the environment and personnel, in addition to having a high cost.

Conventional efforts to provide containment of contamination with respect to drill rig systems during drilling and sealing operations have utilized sacrificial external casings, or sacrificial drill shafts and bits that are left in place in the waste. Such approaches can be costly due to the increased number of necessary components and may undesirably provide infiltration pathways into the buried waste.

U.S. Pat. No. 5,980,446 to Loomis et al., the disclosure of which is incorporated herein by this reference, is directed to a system for stabilizing a subterranean waste site using jet grouting. A thrust block is installed over a subterranean waste site, providing a surface from which drilling into the subterranean waste site can take place with minimal disturbance of the site. Grout monoliths for immobilizing contaminants and filling any voids in the waste site are disclosed and are asserted to aid in containing at many waste sites. However, containment of contaminants during the drilling process is not provided, requiring the practice of additional conventional measures for the use of this technique at radioactive or other highly contaminated sites.

Accordingly, what is needed are systems and processes for drilling and sealing at highly contaminated sites while concurrently maintaining containment of the contaminants. Methods for such containment that enable manned drilling on site and reduce the complexity of systems needed for containment would be advantageous. A process or system that allowed for a drill stem to be inserted into a contaminated site, removed and reinserted at a different location, while maintaining containment would be further advantageous.

BRIEF SUMMARY OF THE INVENTION

The present invention includes systems and methods relating to subterranean drilling while maintaining containment of any contaminants released during the drilling operation. A thrust block installed over a zone of interest provides an overflow space for retaining any contaminants released from the zone of interest and excess sealant returns. A relatively negative air pressure may be maintained in the overflow space by a ventilation system. A number of sealed access ports are placed in the thrust block. The overflow space is sealed from the surrounding environment before drilling with a membrane seal that is punctured by the drill. A flexible sack seal contained in the access port may be connected to a drill shroud prior to drilling, providing containment once the membrane seal is punctured and during drilling. The drill shroud may be adapted to any industry standard drilling rig and includes a connection conduit for connecting to the flexible sack seal and a flexible enclosure between two brackets. As the drill shaft is withdrawn, sealant may be injected to form a sealant column, overlapping sealant columns may create a monolith for immobilizing the contaminants. Upon withdrawal, the sack seal may be closed off and separated, maintaining containment of the overflow space and the drill shroud. The process may be repeated at a number of access ports. Sensors and monitors may be used to verify containment, to monitor sub-thrust block conditions and to examine for leakage throughout the drilling and sealing process.

DETAILED DESCRIPTION OF THE ILLUSTRATED EMBODIMENTS

The environmental threat produced by buried waste begins when contaminants produced by buried waste leach into the associated lithography and/or groundwater, as when designed containment for the buried waste fails. Once the lithography or groundwater has been contaminated, the potential harm is great, because groundwater typically makes its way to rivers and lakes, which are frequently sources of drinking water and irrigation water. In this manner, the contaminants originally produced by buried waste make their way, directly or indirectly, to plants, animals and humans. With highly contaminating or long-lasting contaminants, such as radioactive wastes, the potential for groundwater contamination may persist for extremely long periods reaching into decades.

Methods of attempting to immobilize contaminants in buried wastes include the emplacement of barriers around the wastes and injection of grouts into waste sites. As these methods involve drilling and digging, contaminants may be released into the surrounding environment during the immobilization operation. Often such methods must be conducted by remote control drilling units, by drilling systems involving elaborate containment systems and/or by workers using personal containment systems for self-protection. Such methods have been expensive and difficult to implement reliably on an ongoing basis and in a variety of different environments. The present invention provides robust and reliable systems and methods to provide contaminant containment during subterranean drilling which are simple in both design and implementation.

Figure 1:
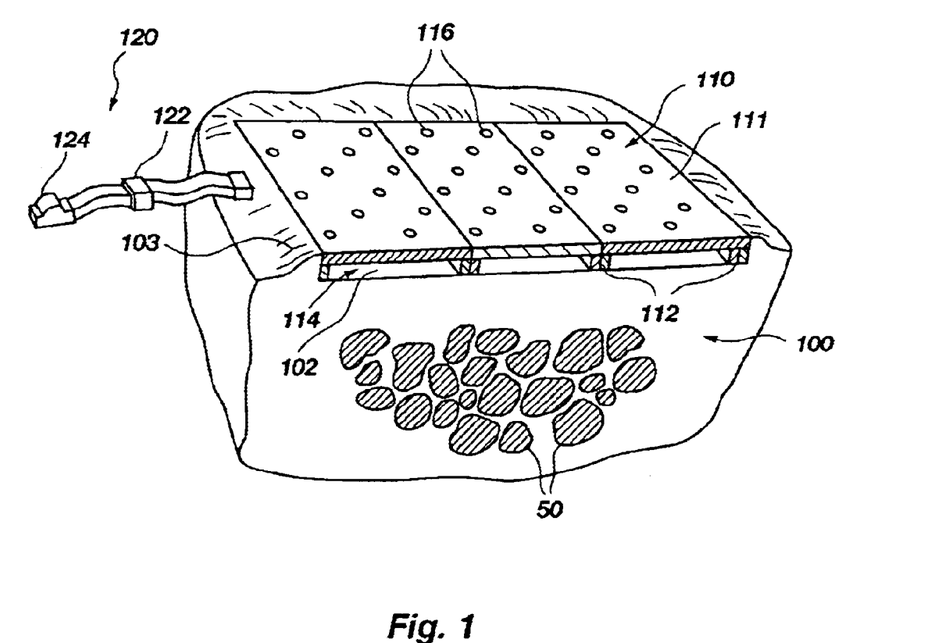
FIG. 1 is a perspective view of an embodiment of a thrust block installed over a zone of interest in accordance with the present invention.

Turning to FIG. 1, a containment system 100 including a thrust block 110 is shown installed over a zone of interest 100. In connection with the systems and methods of the present invention, thrust block 110 provides isolation and containment of the zone of interest 100, reducing the likelihood of a release of the contaminants 50 therein into the surrounding environment during out injection.

The thrust block 110 may be constructed from any material that has sufficient strength and rigidity to accommodate the personnel and equipment needed for drilling and injecting sealant into the zone of interest 100 and operation thereof. Suitable materials may include prestressed concrete, steel and metallic alloys, wood, plastics and other composites or any suitable combination of materials. The thrust block 110 may be built in place or can be constructed off site and assembled and installed as a modular design. The thrust block 110 must be able to support the weight of both personnel and the drilling rig and injection equipment, which may reach or even exceed 15 tons, and to withstand the movement of equipment thereover during the sealing process.

Thrust block 110 may be configured as one or more platforms 111 supported above the ground surface 102 by supports such as I beams 112, creating an overflow space 114 between the thrust block 110 and the ground surface 102. Overflow space 114 may be sealed from the surrounding environment, as by the creation of a berm 103 around the periphery of thrust block 110. Additional sealing may be achieved through application of a polyurea, or equivalent, ground surface covering. It will be appreciated that any method of sealing the periphery of overflow space 114 may be used. Overflow space 114 and the ground surface 102 may be accessed via one of a number of access ports 116 located in the thrust block 110. Features of the access ports 116 will be discussed further herein in connection with FIG. 2 et seq. The access ports 116 should be appropriately spaced to allow sealant injected into the zone of interest 100 therethough to overlap and create a monolithic subterranean structure. The actual spacing of access ports 116 will thus vary with the drilling equipment selected. Relative to the air pressure of the surrounding environment, negative pressure may be maintained in the overflow space 114. This may be accomplished by use of a ventilation system 120 including one or more fans 124 and HEPA filters 122 as depicted in FIG. 1 to remove air from the overflow space 114 in order to establish and maintain the reduced pressure. By maintaining comparatively negative pressure in the overflow space 114 containment is further enhanced, as any breach of the sealed area will cause air to flow inwards to the overflow area 114, rather than allow potential contaminants to escape before the seal may be reestablished.

It will be appreciated that, in addition to ventilation system 120 using fans 124 and HEPA filters 122 as shown in FIG. 1, any ventilation system known to those of ordinary skill in the art may be utilized with the present invention. The ventilation system may provide for the filtration of the air removed from the overflow space 114, enabling improved containment of contaminants. Additionally, the ventilation system may include additional components for filtering and/or processing any liquid effluent from the zone of interest 100 that enters the overflow space 114 during the sealing process. This may be as simple as providing a collection point, such as a holding tank, for the effluent, allowing the effluent to be removed and treated at another place or it may include the provision of collection tanks, treatment tanks where thermal or chemical treatment of effluent may be applied, filtration systems where contaminants may be removed from the effluent, or any other necessary or desired components. Where thrust block 110 is formed from a number of separate modules, individual filtration systems may be used for each module or may be manifolded to support a number of modules in a large scale application.

Figure 2:
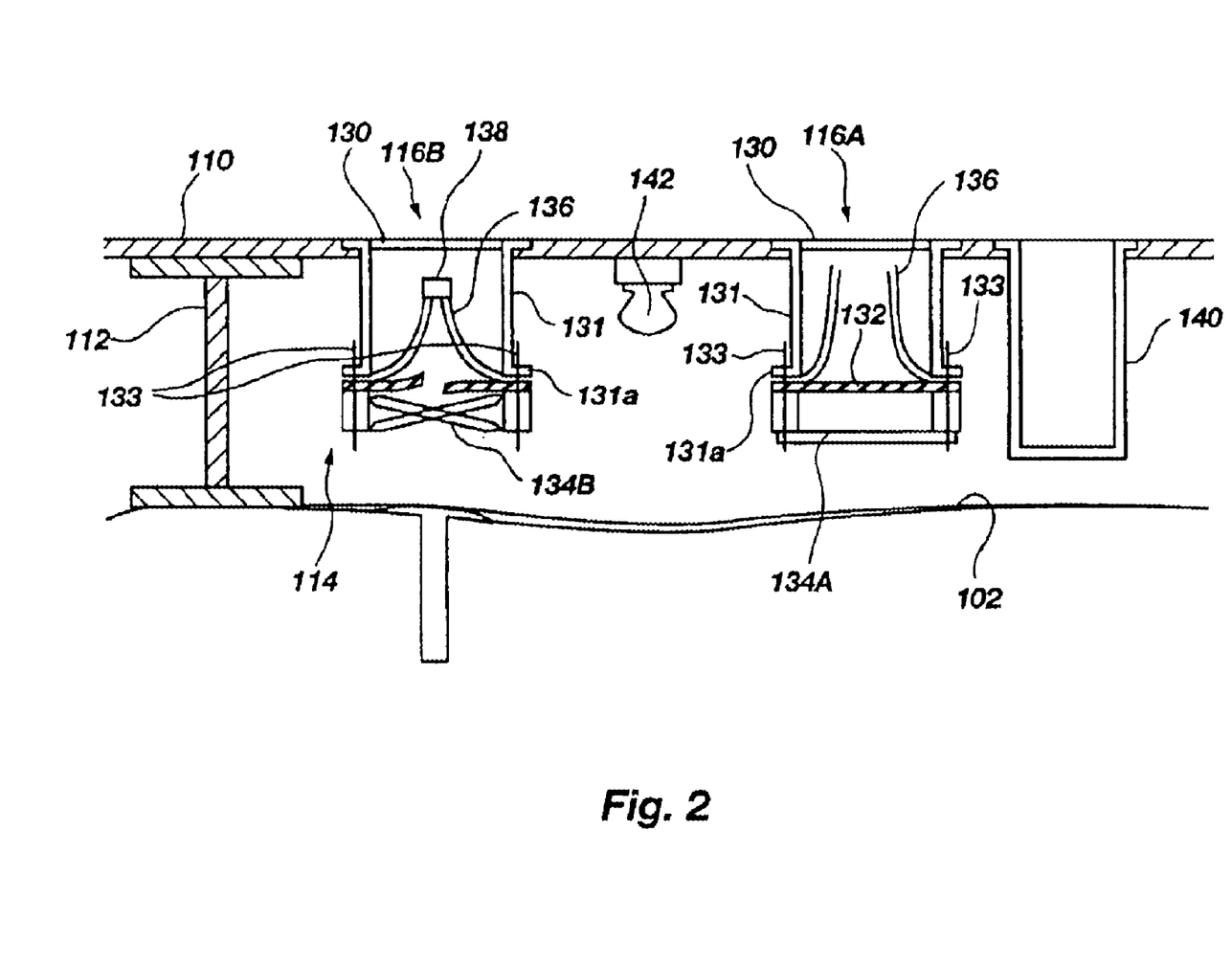
FIG. 2 is a side view of a thrust block in accordance with the teachings of the present invention, depicting features of the access ports.

Turning to FIG. 2, an enlarged cross sectional view of the thrust block 110 is depicted, highlighting some of the features thereof in accordance with the present invention. An examination cylinder 140 extends downwardly through the thrust block 110 into the overflow space 114. The examination cylinder includes at least one transparent window and may be entirely transparent, constructed of a clear plastic or similar material, allowing visual examinations to be made therethrough. The term "cylinder" is used as a term of art, and examination cylinders 140, while typically of a cylindrical shape having a round cross-section, may be of any suitable configuration such as, for example, a hemisphere. A number of examination cylinders may be disposed throughout the thrust block 110. Visual monitoring equipment, such as a still camera, digital camera, video camera or a light source may be placed into an examination cylinder 140. Where the thrust block 110 includes a number of examination cylinders 140, a pattern of visual data collectors and illuminating sources may be used to enable the entire overflow space 114 to be monitored. Visual monitoring may continue after the sealing of the zone of interest is complete, to check for containment over time. It will be appreciated that other forms of monitoring that may be conducted through a transparent window may be conducted utilizing the examination cylinders 140. For example, infrared or ultraviolet sensors or emitters may be placed in the examination cylinders to monitor the overflow space 114.

One or more sensors 142 may also be placed in the overflow space 114, as by attaching to the underside of the thrust block 110, in order to provide monitoring of the overflow space 114. Humidity, air pressure, temperature in the overflow space 114 and proximate or within the thrust block 110 may be monitored to ensure that treatment of the zone of interest 100 is conducted within acceptable limits. Monitors for contaminants, such as radiation monitors or volatile organic compound (VOC) detectors may be used to detect releases from the zone of interest 100 or to track the affixation of the contaminants within a monolith being formed by sealant within the zone of interest 100. Suitable sensors 142 for monitoring the zone of interest 100, the overflow space 114 and/or the thrust block 110 include contaminant presence/concentration sensors to measure both the types and concentration of contaminants present in the overflow space 114. Likewise, radiation detection and measurement ('RDM') sensors may be used to monitor and report radiological activity in zone of interest 100 or the overflow space 114

In addition to their respective sensing functions, the sensors 142 may be configured to feed data to a data management system 180 for processing and analysis. Data management system 180 may be a computer system integrating hardware, software, sensor output, positioning information and data analysis functions.

A variety of different sensor types are contemplated as being suitable for performing the functions of a contaminant presence/concentration sensor, or a RDM sensor. In particular, the function of contaminant presence/concentration sensor may be performed by a surface acoustic wave (SAW) sensor or solid state sensor such as a field effect transistor (FET), as well as by Fourier transform infrared spectrometry (FTIR), time domain electromagnetics, or the like. The radiation detection and measurement functions of a RDM sensor may be performed by gamma-ray spectrometry, plastic scintillators, scintillating fibers, miniature chamber detectors, or the like. This invention contemplates as within its scope various other suitable types of sensors that will provide the required functionality as described herein.

Sensors 142 may also include a variety of sensors for performing a number of different functions that may permit monitoring of various aspects of the thrust block. Integrity sensors may be used to determine whether there are cracks, voids, or other defects in the thrust block 110 or in joints between thrust block sections that could permit leakage of contaminants therethrough Thrust block 110 integrity may be evaluated in any desired and appropriate way. For example, acoustic/ultrasonic time domain reflectometry sensors that detect cracks and large voids in structures such as the thrust block 110 may be used. Also, known optical fiber sensors that employ fiber optic principles to make strain measurements in the thrust block 110 and thereby detect the onset and growth of voids and cracks may be used. Because thrust block integrity can be meaningfully evaluated in a variety of different ways, any sensor type that would be suitable for directly or indirectly measuring and evaluating thrust block integrity may be used.

Sensors 142 may also include a migration sensor for detecting migration and leakage of contaminants. A migration sensor may be a sensor incorporating fiber optic coupled optical spectroscopy functionality for measuring, for example, volatile organic compounds (VOCs) that may be present in the overflow space 114. However other migration sensors suitable for measuring chemical migration, and emission of VOCs and the like are contemplated as being within the scope of the present invention Access ports 116 may include a number of structures that aid in containing contaminants during sealing of the zone of interest. Each access port 116 defines a bore which is sized to allow the zone of interest 100 to be reached with drilling equipment inserted therethrough. Access ports 116 may have any suitable cross-section shape, including round, square, rectangular, etc, so long as it allows the drilling equipment to be inserted therethrough. The shape may be selected with consideration toward the drilling equipment to be used.

The access ports 116 may be formed as an integral part of the thrust block 110 or they may be formed as discrete units that are installed therein. Where the access ports 116 are formed as discrete units, the thrust block 110 may easily be reused at a different site by replacing the access ports. At locations with multiple contaminated sites, or a single large contaminated site this enables a single thrust block 110 to more easily and/or more rapidly be reused.

A cover 130 provides containment to the access port 116 both prior to and after treatment of the zone of interest 100. The cover is removed to allow drilling or injection equipment to be inserted into the zone of interest 100. The cover 130 may merely sit atop the access port 116, lying on a recessed shoulder created for that purpose or it may securely attach in place, as by being threadedly engaged with the walls 131 of the access port 116. Once drilling and/or sealant injection through the access port 116 is complete, the cover 130 may be permanently affixed to provide additional containment, as by cementing the cover 130 in place or by cementing over an installed cover 130. The cover 130 may be constructed of any suitable material, able to support the weight of drilling equipment moving across the thrust block 110 and thereover.

A flexible sack seal 136 is located inside each access port 116. Flexible sack seal 136 may be formed of any suitable material, including polymers, and may be formed as a single walled or multiple walled sack attached to the access port wall 131 defining the access port 116, such as by fasteners 133 extending through a flange 131a at the lowermost end of access port wall 131. Flexible sack seal 136 as illustrated is substantially tubular in configuration, with a lower skirt portion thereof secured to flange 131a. A double walled sack is currently preferred for use. Flexible sack seal 136 is configured to attach to the drilling equipment, as will be discussed further herein, to provide containment during the drilling and sealing operations. As shown with respect to access port 116B a sack closure 138 such as a twist closure may be applied to the flexible sack seal 136 to seal the access port once drilling therethrough is complete. Access port 116A, on the other hand, depicts an exemplary access port prior to drilling therethrough.

A diaphragm seal 132 is disposed across each access port 116 below the flexible sack seal 136. Diaphragm seal 132 either attaches to, or provides a seal in connection with, walls 131, providing a seal across the access port 116 prior to the insertion of drilling equipment therethrough. Diaphragm seal 132 may be constructed of any suitable material which may provide a seal across the access port 116 and may be pierced by a drill bit passed therethrough. Suitable materials may include rubbers, polymers and other plastics. Where possible, a material that subsequently substantially closes the hole created therein by the drilling equipment passing therethrough may be used.

A wiper assembly 134 is disposed below the diaphragm seal in the access port 116. The wiper assembly 134 is designed to "wipe off" or clean the drilling or injection equipment being withdrawn from the zone of interest 100 through the access port 116. Suitable assemblies include a material forming a seal across the access port 116 that is pierced by the drilling equipment upon insertion and provides a wiping surface upon retraction, such as a sponge-like material or a reinforced rubberized material, forming a seal-like wiper 134A. Alternatively, one or more flexible wipers that are pushed aside by the drilling equipment, then reside adjacently next to the drilling equipment to provide a scraping or wiping surface upon retraction may be used, such as wiper blades 134B. By locating wiper assembly 134 at the lowermost end of access port 116, any material removed from the drilling equipment thereby will fall into the overflow space 114.

Figure 3:
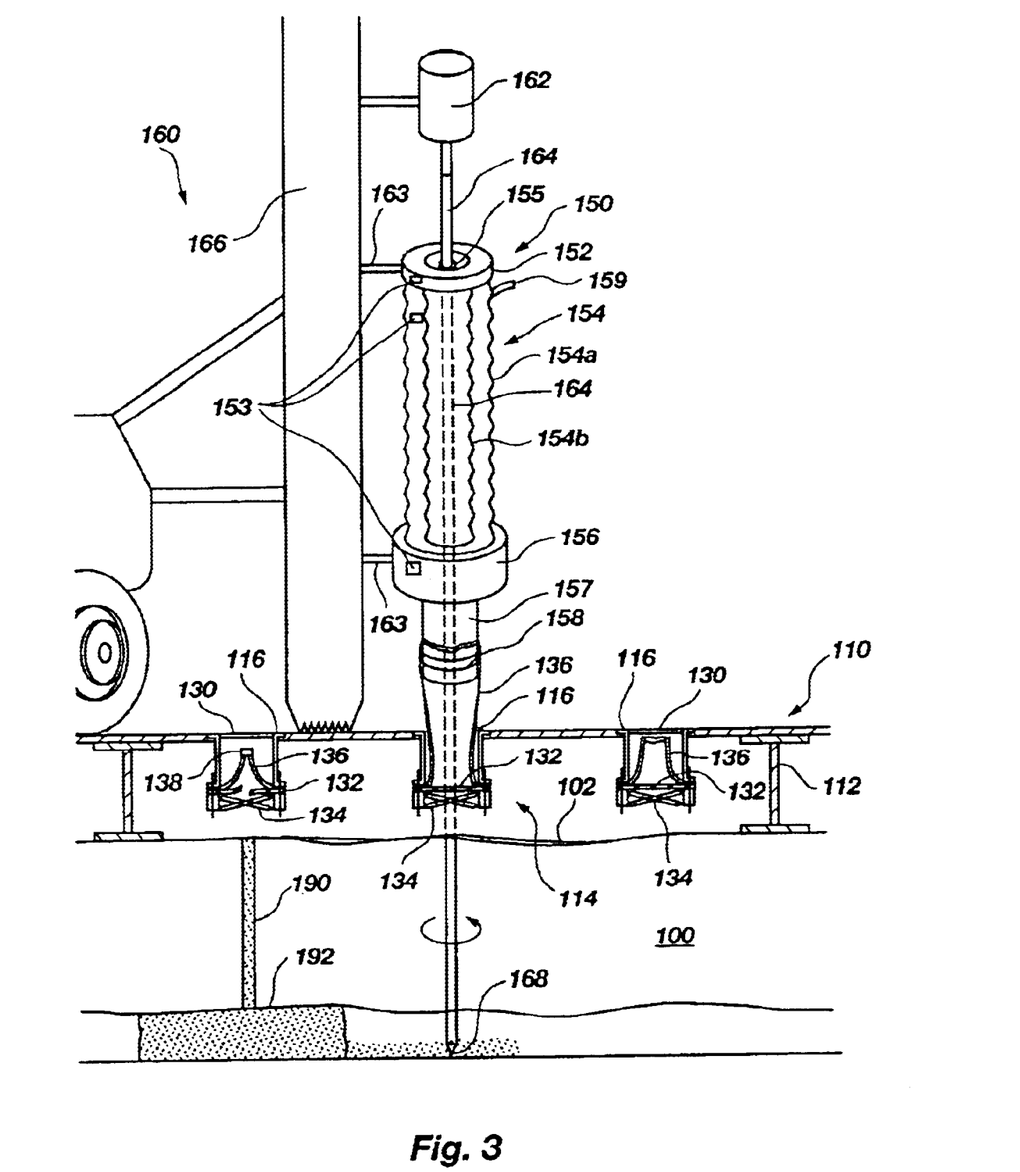
FIG. 3 is a side view of a drill shroud for use in connection with a drill rig, shown in connection with a thrust block.

Turning to FIG. 3, a drill string shroud 150 configured in accordance with the present invention is depicted as attached to a drilling rig 160. It will be appreciated that drilling rig 160 may be any commercially available drilling rig as known to those of ordinary skill in the art, and the drill shroud 150 may be appropriately sized for use with any such drilling rig 160. Drilling rig 160 may include a drill mast 166 for supporting the drill assembly. A drive unit 162 shown configured as a top drive is attached to the drill mast 166 and provides the rotational and/or percussive driving force for the drilling operation. Drill "steel" or shaft 164 attaches to the drive unit 162 to enable the driving force to be transmitted to the drill bit 168. It will be appreciated that although a sharp pointed drill bit is depicted, which may be useful for piercing any containers, such as steel drums that reside in the zone of interest 100 allowing fixation of the contents thereof in the monolith, that a rounded drill bit which pushes aside debris and containers, such as plastic bags, in the zone of interest 100 may be used where desired.

Drill shroud 150 is supported by an upper bracket 152 and a lower bracket 156 which are each attached to the drill mast 166 by bracket supports 163. It will be appreciated that, although circular brackets 152 and 156 are depicted, any shape of bracket or enclosure may used, so long as an enclosed space for a drill shaft is maintained. Upper bracket 152 and lower bracket 156 are suitably longitudinally spaced to enable a full stroke of drill shaft 164 to its greatest downward extension. Thus, drill shroud 150 has been shown foreshortened in FIGS. 3 and 4 for clarity. Upper bracket 152 includes at least one seal 155 that encircles the drill shaft 164 to prevent the release of contaminants therethrough. Multiple seals 155 with redundant sealing function may be used to reduce the chance of a breach of the sealing function. Sealing a rotational shaft at its entry to a containment area may be accomplished using any arrangement known now or in the future to those of ordinary skill in the art.

A flexible, substantially tubular enclosure 154 extends from the upper bracket 152 to the lower bracket 156, providing a contained area for encircling the drill shaft 164. The flexible enclosure 154 may be constructed of any material that allows sufficient movement of the brackets 152 and 156 relative to one another and provides appropriate sealing containment. This ability allows the drilling rig 160 to fully extend and retract the drill shaft 164 while maintaining containment. While a single layered flexible enclosure 154 may be used, a multiple layered flexible enclosure 154 comprising concentric envelopes 154a and 154b as shown may be desirable to provide redundant containment and protection for the sealing function. A double walled enclosure is currently preferred.

The upper end of lower bracket 156 is attached to the flexible enclosure. A connection conduit or "base stinger" 157 extends downwardly from the lower bracket 156. The connection conduit 157 may be formed as an extension of the lower bracket 156 or it may be separately removable therefrom, allowing it to be replaced as needed. In use, a flexible sack seal 136 associated with access port 116 through which drilling is being conducted may be drawn at least partway over the exterior of connection conduit 157 and sealed thereto, providing a single contained area from the drill shroud 150 to the overflow space 114. Connection conduit 157 may include one or more o-ring seals 158 that compress against the conduit 157 and the flexible sack seal 136 creating a sealed connection therebetween. Connection conduit 157 may include additional structures to retain the flexible sack seal 136 in place, such as fasteners or a flange located on the connection conduit 157, although it is within the scope of the present invention to provide a frictional fit between the connection conduit 157 and flexible sack seal 136, especially through a sealing element, such as the o-rings 158 to provide a seal and retain the connection. Alternatively, a constrictive spring band or mechanical clamp may be placed around the flexible sack seal 136 and connection conduit 157 to secure and maintain the connection.

The drill shroud 150 may contain one or more air filters 153. Air filter 153 may be disposed in the upper bracket 152, the flexible enclosure 154, the bottom bracket 156 or in the connection conduit 157. Where present, the 153 air filters facilitate the extension and retraction of the drill shaft 164 by allowing excess air to flow in and out of the drill shroud 150 while maintaining containment of contaminants.

In operation for sealing a zone of interest 100 by creating a monolith of sealant and contaminants entrained therein, the containment systems of the present invention may be used as follows. A thrust block 110 may be installed over a zone of interest 100, such as a waste site containing radioactive waste. As described previously herein, the overflow space 114 created underneath the thrust block may be sealed and a relatively negative air pressure created therein. A drilling rig 160 is then provided for sealing the zone of interest 100. Drill shroud 150 is positioned above an access port 116. With cover 130 removed, a flexible sack seal 136 is extended upwardly from the access port 116 and attached to the connection conduit 157.

Drill shaft 164 is then extended, causing drill bit 168 to pass through the diaphragm seal 132 and wiper assembly 134. Once the diaphragm seal 132 is pierced, the volume defined by overflow space 114 and enclosed by the thrust block 110 may become continuous with the drill shroud 150 volume. The ventilation system will then maintain the relative negative pressure in the drill shroud 150 volume as well as in overflow space 114. Containment is provided by diaphragm seal 132 prior to puncture, at which point the flexible sack seal 136 and drill shroud become the containment barrier.

As drilling continues, drill shaft 164 is extended across overflow space 114 to and past ground surface 102, into and through the zone of interest 100. Depending on the drill bit 168 selected, containers in the zone of interest may be pushed aside or pierced if encountered by the drill bit 168.

Once the drill shaft 164 has been extended to the desired depth, a sealant 190 may be injected into the zone of interest 100. The form of the injection will vary based upon the drilling equipment that has been selected for use. For example, where a hollow drill shaft 164 with injection ports located near the drill bit 168 is used, a sealant 190 may be injected through the drill shaft and apertures in the drill bit 168 as the drill shaft 164 is withdrawn from the zone of interest 100. Alternatively, where the drill shaft 164 includes a cuttable outer pipe and a inner injecting pipe, the sealant 190 may be injected as the inner pipe is rotated and raised, cutting through the outer pipe. Excess sealant will be captured in the overflow space 114.

As the drill shaft 164 is withdrawn from the zone of interest 100 and ground surface 102, materials clinging thereto are removed by the wiper assembly 134. Once drill shaft 164 is withdrawn into drill shroud 150, containment in overflow space 114 may still be maintained by sealing flexible sack seal 136 with a sack closure 138 below the connection conduit 157 and cutting through the closure 138 to separate the drill shroud 150 from the access port 116 while maintaining the sealing of both. Both of the resulting bag ends may be finished by forming "J-seals" as prescribed for radioactive bag out procedures known to those of ordinary skill in the art. Cover 130 may then be replaced over the access port 116. Alternatively, the drill shroud 150 may be similarly sealed with to sack closures 138 and separated therebetween also providing containment of the potentially contaminated drill shaft 164. Where such alternative is utilized, sack seal 136 may preferably be of a suitable length wherein two sack closures 138 are applied in longitudinally spaced relationship along sack seal 136, which is then severed therebetween, leaving a lower, closed segment of sack seal 136 secured to its access port 116 and an upper, closed segment of sack seal 136 secured to connection conduit 157 of drill shroud 150. Following sealing, cover 130 may then be replaced over the access port 116.

Figure 4:
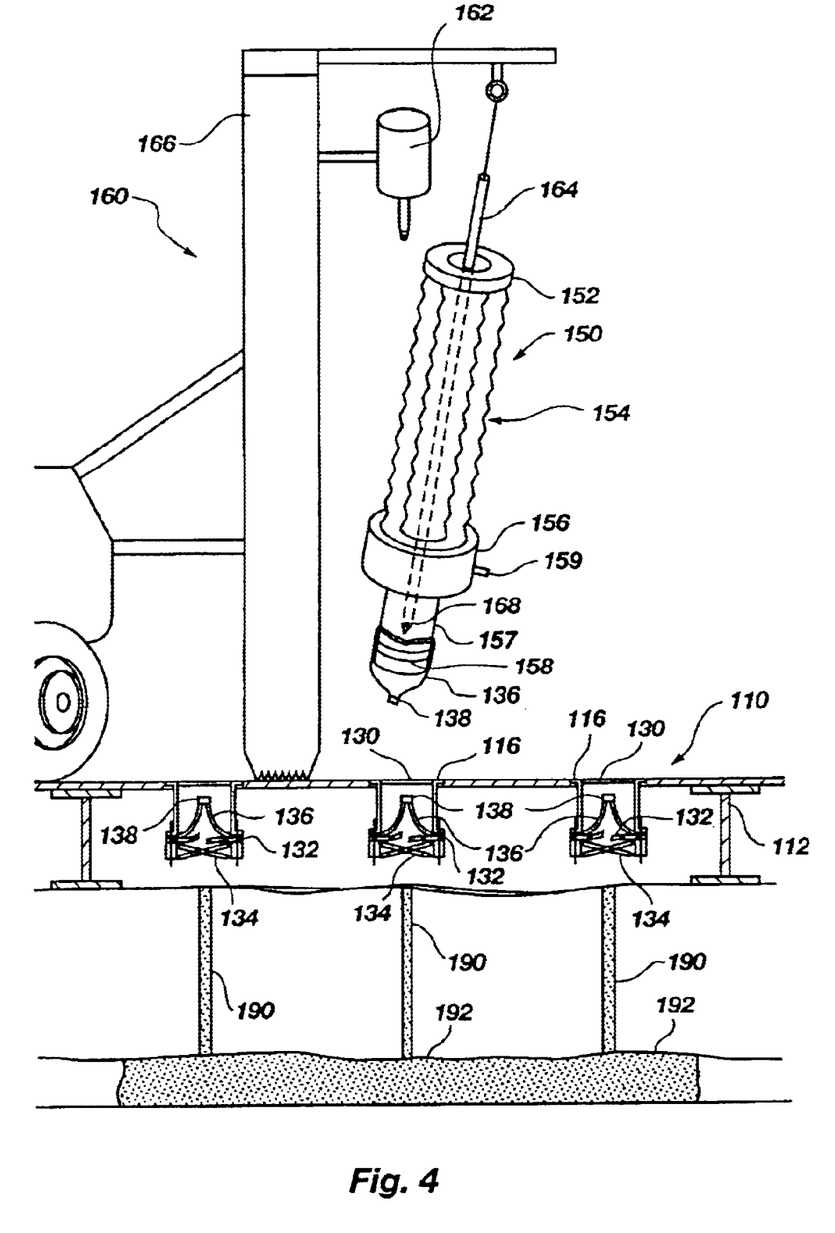
FIG. 4 is a side view of the drill shroud of FIG. 3 after completing a drilling operation.

The entire drill shroud 150 may then be removed as depicted in FIG. 4 for disposal or decontamination, without exposing the surrounding environment to any contaminants disturbed in the drilling or sealing process. This approach may be particularly suited for highly contaminated areas. Quick disconnect components are preferably employed for securing the drill shaft 164 to drive unit 162 and drill shroud 150 to drill mast 166.

Rather than remove the drill shroud 150 upon the completion of each hole, it may be desirable, and less expensive, to reuse the drill shroud at each access port 116. Drill shroud 150, sealed with a portion of flexible sack seal 136 (as is depicted in FIG. 4) is positioned over another access port 116, which may require moving drill rig 160. Flexible sack seal 136 is extended from the access port 116 and sealed to connection conduit 157 as discussed above, over the previous sack seal and closure 138. Drilling then proceeds normally. As drill shaft 164 is extended, the previous sack seal and closure 138 are pulled off the connection conduit and pushed through diaphragm seal 132 by drill bit 168. The removed flexible sack seal portion and closure 138 are then contained overflow space 114. Alternatively, the previous sack seal portion and closure 138 may be pierced by drill bit 168. Treatment of a number of access points 116 may thus proceed with a single contained drill shroud 150, without requiring decontamination between each drilling operations at each access port 116. The ability to insert a drill stem, such as drill shaft 164, into a contaminated zone, remove it and the reinsert at a different location is a unique aspect of some embodiments in accordance with the present invention. Contamination may be confined to the overflow space 114 and the interior of the drill shroud 150. Any contaminants released by the drilling or treatment processes are safely contained from workers and the remainder of the drilling equipment, as well as the surrounding environment, throughout the work process.

As work progresses, drill shroud 150 volume may be checked for contamination, and a drill shroud 150, sealed with a remaining portion of a flexible sack seal 136 and closure 138 may be decontaminated in place where possible. For example, where a radioactive waste is contained in the zone of interest 100, the drill shroud may be examined with radiation detectors (as discussed previously herein), which may even be mounted in the drill shroud 150. Where a sufficiently low reading, indicating a lack of contamination, is present the remaining portion of the flexible sealing sack 136 may be removed and the operation recommenced at the next access port 116 (or may be removed by continued operation as discussed previously herein). Where examination indicates contamination in the drill shroud 150, as by radioactive waste clinging to the drill shaft 164, the sealed drill shaft 164 may be disposed of, or it may be decontaminated for reuse. Decontamination may occur in any manner known now, or in the future, to those of ordinary skill in the art and may vary based upon the specific contaminant. A decontamination nozzle 159, such as a concentric nozzle or a one-way valve can allow a decontamination treatment to be applied. For example, where appropriate, the entire volume of the drill shroud 150 may be filled with pelletal $CO_2$, to decontaminate the complete drill string. Once decontamination is complete, drilling may be commenced at the next access port 116.

Alternatively, the drill shroud 150 may be decontaminated prior to separation of the flexible sack seal 136. During, or after, retraction of drill shaft 164, a decontamination treatment, such as pelletal $CO_2$, may be provided through the decontamination nozzle, passing through the access port 116 into the overflow space 114. Decontamination treatment materials are then contained in overflow space 114. Upon completion of decontamination of the drill shroud 150, the sack seal may be sealed and separated as discussed previously herein, and operations continued at the next access port 116.

Sealant 190 is injected as the drill shaft 164 is retracted at each access port 116, the sealant 190 penetrates the surrounding soil and contaminants to form a sealant column 192 locking the contaminants in place as the sealant 190 sets. By spacing access ports 116 appropriately, the sealant columns 192 should overlap forming a monolith of sealant 190 material, soil and contaminants. Where it is desired to merely lock the contaminants in situ for long term storage, a unitary monolith may be formed having consistent sealant 190 qualities. Where it is desired to fix the contaminants in place and then remove the contaminated soil and sealant 190 to another site for treatment or storage, a divisible monolith may be created by selecting an appropriate sealant 190.

While a wide variety of sealants may be used to lock contaminants in place, the choice of sealant 190 may depend on the type of contaminant to be contained, if containers are present in the zone of interest 100 and what type of containers are present, soil conditions, topography, and the purpose of the sealing (long term in situ storage vs. temporary containment). Suitable sealants may include grouts, such as cementious mixtures and analogs of natural cements, as well as synthetic polymer materials, and mixtures thereof. Information on various types of jet grouting materials suitable for immobilization or containment and retrieval techniques as well as long term storage may be found in U.S. Pat. No. 5,980,446, the disclosure of which has been incorporated by reference herein.

Analogs of natural cements are especially adapted for long term storage and may enable encapsulation and isolation of waste materials for geologic time periods, converting unconsolidated waste material and soil into impermeable and durable rock. Such analogs are generally inexpensive as well. Examples of natural cement analogs include iron oxides and hydroxides. Additional information on analogs of natural cements may be found at column 15, line 33 to column 16, line 63 of U.S. Pat. No. 5,980,446, the disclosure of which has been incorporated by reference herein. Additional information on synthetic polymeric sealants, which may be useful for shorter term immobilization such as immobilization for extraction, may be found at column 16, line 64 to column 18, line 20 of U.S. Pat. No. 5,980,446, the disclosure of which has been incorporated herein by reference. It will be appreciated that, where appropriate, conventional grouts and sealing clays may be injected as sealants 190 as well.

Once the monolith has been created, and monitoring demonstrates containment or immobilization of the contaminants, the thrust block 110 may be disassembled, decontaminated (if necessary) and reused at another location. If reuse is contemplated, it is desirable to apply a nonstick surface treatment thereto to aid decontamination. Alternatively, thrust block 110 may be left in place to provide additional containment. Where the thrust block 110 left in place the overflow space 114 may be filled with sealant, to provide yet more containment redundancy.

Once sealing procedures are completed, the drilling rig 160 should remain uncontaminated after the removal of the drill shroud 150, as all components contacting the waste have been removed. The drive unit 162 or sealant injection system components may be connected to a water source using a clean out manifold and flushed out. If contamination has occurred, appropriate decontamination solutions may be applied. Other ancillary features may be included in the thrust block 110 to facilitate procedures. For example, a glove box may be mounted on the thrust block 110 for injection nozzle maintenance and a clean-out manifold may be provided to facilitate a system flush for grouting operations.

The present invention has been described chiefly in terms of forming a monolith for buried waste, but the systems and methods of the present invention are suitable for other applications and may be used for almost any procedure requiring containment during subterranean drilling. For instance, installation of monitoring wells or probes, emplacement of slurry walls and barriers, as well as in-situ stabilization, and even VOC extraction with steam or hot air, as well as mining applications may all be conducted with the systems and methods as disclosed herein.

It will be apparent that details of the apparatus and methods herein described can be varied considerably without departing from the concept and scope of the invention. The claims alone define the scope of the invention as conceived and as described herein.

What is claimed is:

1. A thrust block for use in containing contaminants during subterranean drilling operations, comprising:
    a platform configured for disposition of drilling equipment thereon;
    at least one access port disposed in the platform, the at least one access port comprising a bore passing through the platform;
    a diaphragm seal comprising a membrane disposed across the bore; and
    a flexible sack seal disposed in the bore above the diaphragm seal.

2. The thrust block of claim 1, further comprising a wiper assembly disposed underneath the diaphragm seal.

3. The thrust block of claim 2, wherein the wiper assembly comprises a sealing material or at least one wiper blade assembly disposed across the bore of the at least one access port.

4. The thrust block of claim 1, further comprising a cover removably disposed across the bore and having a top surface substantially flush with a top surface of the platform.

5. The thrust block of claim 1, further comprising at least one support disposed underneath the platform for elevating the platform to form an overflow space between the platform and a ground surface of the drilling site.

6. The thrust block of claim 1, wherein the flexible sack seal comprises a double-walled, substantially tubular sack.

7. The thrust block of claim 1, wherein the at least one access port comprises a replaceable unit.

8. The thrust block of claim 1, further comprising an examination cylinder disposed in the platform and extending below a lower surface thereof for enabling examination of an area under the platform therethrough.

9. The thrust block of claim 8, wherein the examination cylinder comprises a transparent structure.

10. A system for containment during subterranean drilling, the system comprising:
    a thrust block, the thrust block comprising:
        a platform configured for disposition of drilling equipment thereon;
        at least one access port disposed in the platform, the at least one access port comprising a bore passing through the platform;
        a diaphragm seal comprising a membrane disposed across the bore; and
        a flexible sack seal disposed in the bore above the diaphragm seal;
    a drill shroud comprising:
        an upper bracket configured for attachment to a drilling rig,
        a lower bracket configured for attachment to a drilling rig,
        a flexible enclosure secured to and extending between the upper and lower brackets and defining a volume therewithin;
        a connection conduit configured for forming a sealed connection with a flexible sack seal secured to and extending downwardly from the lower bracket; and
        a drill shaft for connection to a drive unit of a drilling rig, the drill shaft passing through the upper bracket and retractable within the volume by elongating the flexible enclosure.

11. The system of claim 10, further comprising a wiper assembly disposed underneath the diaphragm seal.

12. The system of claim 11, wherein the wiper assembly comprises a sealing material or at least one wiper blade assembly disposed across the bore of the at least one access port.

13. The system of claim 10, further comprising a cover removably disposed across the bore and having a top surface substantially flush with a top surface of the platform.

14. The system of claim 10, wherein the flexible sack seal comprises a double-walled sack.

15. The system of claim 10, wherein the at least one access port comprises a replaceable unit.

16. The system of claim 10, wherein the thrust block further comprises at least one support disposed underneath the platform for elevating the platform to form an overflow space between the platform and a ground surface of the drilling site.

17. The system of claim 16, further comprising an examination cylinder disposed in the platform and extending below a lower surface thereof for enabling examination of an area under the platform therethrough.

18. The system of claim 17, wherein the examination cylinder comprises a transparent structure.

19. The system of claim 16, further comprising at least one sensor located and configured for monitoring a characteristic within the overflow space.

20. The system of claim 19, wherein the at least one sensor is selected from the group consisting of presence sensors, concentration sensors, distributions sensors and radiation monitors.

21. The system of claim 19, wherein the at least one sensor is in communication with a computer system.

22. The system of claim 16, further comprising a sealing structure including a berm adjacent at least a portion of the platform for providing containment of contaminants within the overflow space.

23. The system of claim 10, further comprising at least one seal secured to the upper bracket adjacent the drill shaft and in contact therewith for allowing rotation and longitudinal movement of the drill shaft while sealing the volume.

24. The system of claim 10, wherein the flexible enclosure comprises a dual-walled flexible enclosure.

25. The system of claim 10, further comprising at least one o-ring disposed on the connection conduit for forming a sealed connection with a flexible sack seal.

26. The system of claim 10, further comprising at least one mechanical fastening structure for connecting the flexible sack seal to the connection conduit.

27. The system of claim 10, wherein the connection conduit is detachably secured to the lower bracket.

28. The system of claim 10, further comprising a sensor carried by the drill shroud and configured and positioned to detect at least one contaminant present within the volume.

29. The system of claim 28, wherein the sensor comprises at least one of a radiation sensor and a VOC sensor.

30. The system of claim 10, further comprising a decontamination nozzle allowing access to the volume.

31. The system of claim 10, further comprising at least one air filter communicating with the volume and an exterior of the shroud and configured for passage of air therethrough while substantially preventing passage of contaminants therethrough.

32. A method for subterranean drilling, the method comprising:
providing a thrust block including at least one access port comprising a bore passing through the thrust block, a diaphragm seal comprising a membrane disposed across the bore, and a flexible sack seal disposed in the bore above the diaphragm seal, over the drilling site;
providing a drill rig attached to a drill shroud comprising an upper bracket, a lower bracket, a flexible enclosure secured to and extending between the upper and lower brackets and defining a volume therein, a connection conduit secured to and extending downwardly from the lower bracket, and a drill shaft passing through the upper bracket and retractable within the volume by elongation of the flexible enclosure;
attaching the flexible sack seal to the connection conduit; and
advancing the drill shaft downwards to pierce the diaphragm seal and drill into the drill site.

33. The method according to claim 32, further comprising:
retracting the drill shaft into the volume;
sealing the flexible bag seal below the connection conduit to form a sealed bag; and
separating the flexible bag seal above the sealed bag.

34. The method according to claim 33, wherein sealing the flexible bag seal below the connection conduit to form a sealed bag comprises forming two closures with a longitudinal separation space therebetween.

35. The method according to claim 34, further comprising examining the drill shroud for contamination following drilling.

36. The method according to claim 35, further comprising decontaminating the drill shroud of contaminants.

37. The method according to claim 36, wherein decontaminating the drill shroud comprises providing a decontamination substance to the volume via a decontamination nozzle extending from an exterior thereof and in communication with the volume.

38. The method according to claim 37, wherein providing a decontamination substance to the volume comprises providing $CO_2$ pellets.

39. The method according to claim 32, wherein providing a thrust block including at least one access port comprises providing a thrust block including a wiper assembly disposed underneath the diaphragm seal.

40. The method according to claim 32, wherein providing a thrust block comprises providing a thrust block including an examination cylinder disposed in the platform for allowing examination under the platform therethrough.

41. The method according to claim 32, wherein providing a thrust block comprises providing a platform having at least one support disposed thereunder to form an overflow space between the platform and a ground surface of the drilling site.

42. The method according to claim 41, further comprising disposing at least one sensor in communication with the overflow space for monitoring an aspect thereof.

43. The method according to claim 41, wherein disposing at least one sensor in communication with the overflow space for monitoring an aspect thereof comprises disposing a sensor selected from the group consisting of presence sensors, concentration sensors, distributions sensors and radiation monitors.

44. The method according to claim 43, further comprising monitoring the overflow space using a computer system in communication with the at least one sensor.

45. The method according to claim 41, further comprising peripherally sealing the overflow space to provide containment from the surrounding environment.

46. The method according to claim 45, wherein peripherally sealing the overflow space comprises constructing a berm around the thrust block.

47. A process for immobilizing buried contaminants, the process comprising:
providing a thrust block including at least one access port comprising a bore passing through the thrust block, a diaphragm seal comprising a membrane disposed across the bore, and a flexible sack seal disposed in the bore above the diaphragm seal, over a drilling site;
providing a drill rig attached to a drill shroud comprising an upper bracket, a lower bracket, a flexible enclosure secured to and extending between the upper and lower brackets and defining a volume therewithin, a connection conduit secured to and extending downwardly from the lower bracket, and a drill shaft passing through the upper bracket and retractable within the volume by elongation of the flexible enclosure;
attaching the flexible sack seal to the connection conduit;
advancing the drill shaft downwards to pierce the diaphragm seal and drill into the drill site;
injecting sealant into the drill site to form a sealant column;
retracting the drill shaft into the volume;
sealing the flexible bag seal below the connection conduit to form a sealed bag; and
separating the flexible bag seal above the sealed bag.

48. The process according to claim 47, where injecting sealant into the drill site comprises injecting sealant as the drill shaft is retracted.

49. The process according to claim 47, wherein injecting the sealant to form a sealant column comprises injecting sealant through an aperture within a drill bit at a distal end of the drill shaft to form a sealant column overlapping at least one adjacent sealing column to form a subterranean monolith of sealant.

50. The process according to claim 47, wherein sealing the flexible bag seal below the connection conduit to form a sealed bag comprises forming two closures with a longitudinal separation space there between.

51. The process according to claim 47, further comprising examining the drill shroud for contamination following drilling.

52. The process according to claim 51, further comprising decontaminating the drill shroud of contaminants.

53. The process according to claim 52, wherein decontaminating the drill shroud comprises providing a decontamination substance to the volume via a decontamination nozzle extending from an exterior thereof and in communication with the volume.

54. The process according to claim 53, wherein providing a decontamination substance to the volume comprises providing $CO_2$ pellets.

55. The process according to claim 47, wherein providing a thrust block including at least one access port comprises providing a thrust block including a wiper assembly disposed underneath the diaphragm seal.

56. The process according to claim 47, wherein providing a thrust block comprises providing a platform over the drilling site with at least one support disposed underneath the platform to form an overflow space between the platform and a ground surface of the drilling site.

57. The process according to claim 56, wherein providing a thrust block comprises providing a thrust block including an examination cylinder disposed in the platform for allowing examination under the platform therethrough.

58. The process according to claim 56, further comprising disposing at least one sensor in communication with the overflow space for monitoring an aspect thereof.

59. The process according to claim 58, wherein disposing at least one sensor in communication with the overflow space for monitoring an aspect thereof comprises disposing a sensor selected from the group consisting of presence sensors, concentration sensors, distributions sensors and radiation monitors.

60. The process according to claim 59, further comprising monitoring the overflow space using a computer system in communication with the at least one sensor.

61. The process according to claim 56, further comprising peripherally sealing the overflow space to provide containment from the surrounding environment.

62. The process according to claim 61, wherein peripherally sealing the overflow space comprises constructing a berm around the thrust block.

63. The process according to claim 61, further comprising providing relatively negative air pressure relative to the surrounding environment in the overflow space.

64. The process according to claim 63, wherein providing relatively negative air pressure compared to the surrounding environment in the overflow space comprises removing air from the overflow space using a ventilation system.

65. The process according to claim 63, further comprising providing relatively negative air pressure relative to the surrounding environment in the drill shroud.

66. The process according to claim 65, wherein providing relatively negative air pressure compared to the surrounding environment in the drill shroud comprises removing air from the drill shroud using a ventilation system ventilating said overflow space, once said diaphragm seal is pierced.

67. The process according to claim 47, wherein injecting sealant into the drill site to form a sealant column comprises injecting at least one sealant selected from the group comprising analogs of natural cements, synthetic polymeric sealants and mixtures thereof.

* * * * *